(12) United States Patent
Watanabe

(10) Patent No.: US 10,983,780 B2
(45) Date of Patent: Apr. 20, 2021

(54) INFORMATION PROCESSING APPARATUS, INFORMATION PROCESSING METHOD, AND RECORDING MEDIUM

(71) Applicant: Genki Watanabe, Tokyo (JP)

(72) Inventor: Genki Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/655,490

(22) Filed: Oct. 17, 2019

(65) Prior Publication Data
US 2020/0150948 A1    May 14, 2020

(30) Foreign Application Priority Data

Nov. 14, 2018  (JP) .............................. JP2018-213985
Jun. 17, 2019   (JP) .............................. JP2019-111924

(51) Int. Cl.
  *G06F 9/44*      (2018.01)
  *G06F 8/65*      (2018.01)
(52) U.S. Cl.
  CPC ..................................... *G06F 8/65* (2013.01)
(58) Field of Classification Search
  CPC ........................................................ G06F 8/65
  USPC ........................................................ 717/169
  See application file for complete search history.

(56) References Cited

U.S. PATENT DOCUMENTS

| | | | |
|---|---|---|---|
| 9,015,695 B2 | 4/2015 | Nagao | |
| 2009/0187900 A1* | 7/2009 | Nakamoto | G06F 8/65 717/168 |
| 2009/0271779 A1* | 10/2009 | Clark | G06F 8/71 717/171 |
| 2013/0179871 A1* | 7/2013 | Nagao | G06F 8/65 717/170 |
| 2014/0223421 A1* | 8/2014 | Carter | A61B 5/0024 717/168 |
| 2016/0274889 A1* | 9/2016 | Kaminski | G06F 8/658 |
| 2016/0306735 A1* | 10/2016 | Adderly | G06F 8/65 |
| 2018/0285091 A1 | 10/2018 | Asahara | |
| 2019/0265963 A1 | 8/2019 | Watanabe | |

FOREIGN PATENT DOCUMENTS

| | | |
|---|---|---|
| JP | 2011-242891 | 12/2011 |
| JP | 2014-130388 | 7/2014 |
| JP | 2017-107341 | 6/2017 |

\* cited by examiner

*Primary Examiner* — Evral E Bodden
(74) *Attorney, Agent, or Firm* — IPUSA, PLLC

(57) ABSTRACT

An information processing apparatus is configured to update at least one program by updating firmware. The information processing apparatus includes a new/old determiner configured to determine whether a program that is an update target is new or old by using a known program list, the known program list including identification information for identifying whether the program that is the update target is a same program as a known program; and an overwrite determiner configured to overwrite the program that is the update target with a bulk delivery program configured to update the program that is the update target, upon detecting that the program that is the update target is a customized program and is included in the known program list.

12 Claims, 11 Drawing Sheets

FIG.4

PACKAGE 300

| COPY FW<br><br>PART NUMBER: AAA<br>VERSION: 1.50 | KNOWN PROGRAM LIST<br>OF COPY FW<br><br>KNOWN PART NUMBER: CS13302<br>KNOWN PART NUMBER: LRC15402<br>KNOWN PART NUMBER: LRC16000<br>KNOWN PART NUMBER: LRC17548 |
|---|---|
| SCANNER FW<br><br>PART NUMBER: BBB<br>VERSION: 1.00 | KNOWN PROGRAM LIST<br>OF SCANNER FW<br><br>NONE |
| PRINTER FW<br><br>PART NUMBER: CCC<br>VERSION: 1.00 | KNOWN PROGRAM LIST<br>OF PRINTER FW<br><br>KNOWN PART NUMBER: CC-2 |
| SYSTEM FW<br><br>PART NUMBER: DDD<br>VERSION: 2.50 | KNOWN PROGRAM LIST<br>OF SYSTEM FW<br><br>KNOWN PART NUMBER: CS15302<br>KNOWN PART NUMBER: CS16211<br>KNOWN PART NUMBER: LRC16521<br>KNOWN PART NUMBER: DD-1<br>KNOWN PART NUMBER: DD-2 |

INFORMATION PROCESSING APPARATUS, INFORMATION PROCESSING METHOD, AND RECORDING MEDIUM

CROSS-REFERENCE TO RELATED APPLICATION

The present application is based on and claims priority under 35 U.S.C. § 119 to Japanese Patent Application No. 2018-213985, filed on Nov. 14, 2018, and Japanese Patent Application No. 2019-111924, filed on Jun. 17, 2019, the contents of which are incorporated herein by reference in their entirety.

BACKGROUND OF THE INVENTION

1. Field of the Invention

The present invention relates to an information processing apparatus, an information processing method, and a recording medium, capable of updating at least one program by updating firmware.

2. Description of the Related Art

Patent Document 1 discloses a technique of determining whether to apply customized data, when customized data is included in the data set of acquired firmware, and applying the customized data according to the result of the determination. A data set is a collection of data to be processed by firmware. Hereinafter, "firmware" may be referred to simply as "FW" for simplicity of description. The technique disclosed in Patent Document 1 prevents a customization setting of a program from being applied to firmware of an incorrect combination.

Patent Document 1: Japanese Unexamined Patent Application Publication No. 2017-107341

SUMMARY OF THE INVENTION

According to one aspect of the present invention, there is provided an information processing apparatus configured to update at least one program by updating firmware, the information processing apparatus including a new/old determiner configured to determine whether a program that is an update target is new or old by using a known program list, the known program list including identification information for identifying whether the program that is the update target is a same program as a known program; and an overwrite determiner configured to overwrite the program that is the update target with a bulk delivery program configured to update the program that is the update target, upon detecting that the program that is the update target is a customized program and is included in the known program list.

BRIEF DESCRIPTION OF THE DRAWINGS

FIG. 4 is a diagram illustrating an example of a plurality of pieces of FW included in a package, a known program list of each of the plurality of pieces of FW, and known part numbers according to an embodiment of the present invention;

DETAILED DESCRIPTION OF THE PREFERRED EMBODIMENTS

In the technique disclosed in Patent Document 1, when a customized program, a program whose part number is changed, etc., is updated, there is a problem that new/old determination is simply performed by comparing values of versions, and, therefore, it cannot be appropriately determined whether to overwrite the customized program with the update program.

A problem to be addressed by an embodiment of the present invention is to determine whether to overwrite a customized program.

Hereinafter, an embodiment for carrying out the present invention will be described with reference to the drawings.

Figure 1:
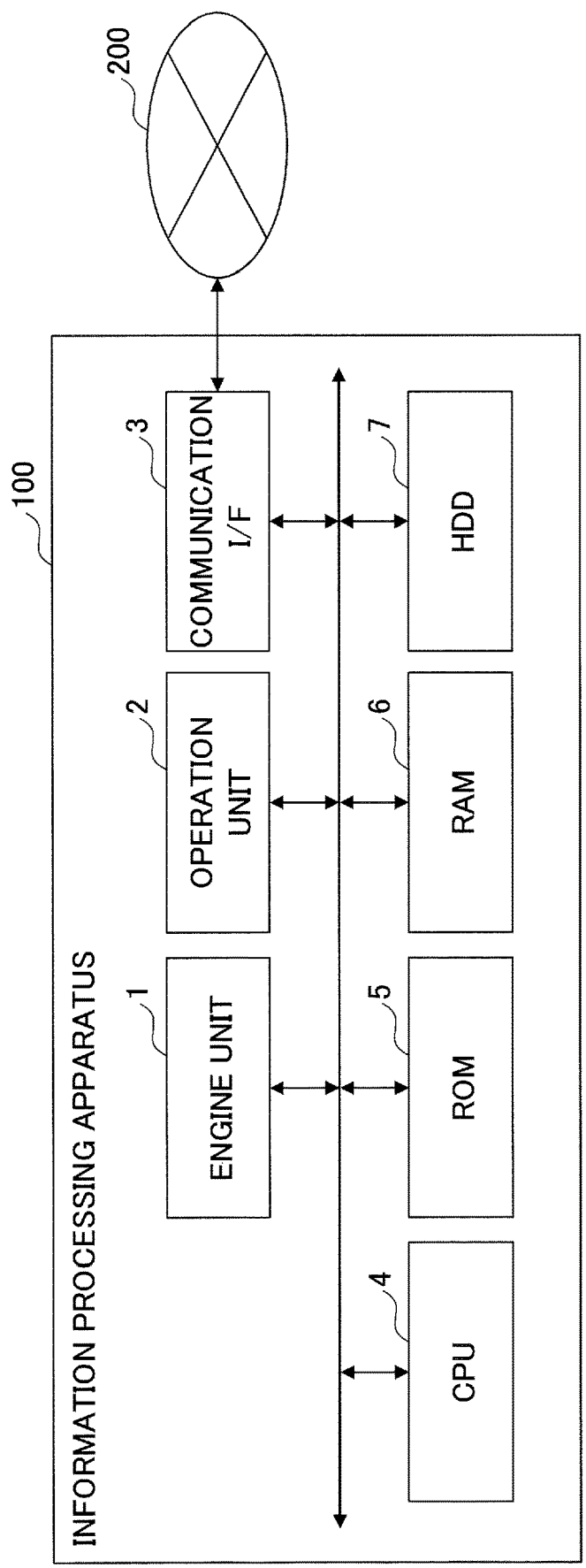
FIG. 1 is a diagram illustrating an example of a hardware configuration of an information processing apparatus according to an embodiment of the present invention.

FIG. 1 is a diagram illustrating an example of a hardware configuration of an information processing apparatus according to an embodiment of the present invention. An information processing apparatus 100 is an image forming apparatus. The image forming apparatus may be, for example, a multifunction peripheral, a copier, a scanner, a facsimile machine, a printer, or the like. The information processing apparatus 100 includes an engine unit 1, an operation unit 2, a communication InterFace (I/F) 3, a Central Processing Unit (CPU) 4, a Read-Only Memory (ROM) 5, a Random Access Memory (RAM) 6, and a Hard Disk Drive (HDD) 7.

The engine unit 1 performs general-purpose information processing for implementing a function of a multifunction peripheral, a function of a copier, a function of a scanner, a function of a facsimile machine, or a function of a printer, with respect to the image forming apparatus. The engine unit 1 is a hardware element that performs processing other than communication. For example, the engine unit 1 includes a scanner (image reading unit) for scanning and reading an image of a document, a plotter (image forming unit) for printing information onto a sheet material such as paper, a facsimile unit for performing fax communication, and the like.

The operation unit 2 is a user interface that accepts an operation to a copy machine or the like by a user and provides information to a user by displaying information corresponding to the operation on a screen (not illustrated). The communication I/F 3 is a communication interface for connecting the information processing apparatus 100 to a network 200. The network 200 may be the Internet, an intranet, or the like. The network 200 is not limited to the Internet or the intranet, but may be any communication network capable of transmitting information, such as a network for mobile terminals. The CPU 4 controls the operations of the main unit of the information processing apparatus 100 in an integrated manner. The CPU 4 controls the operations of the entire information processing apparatus 100 by executing programs, which are stored in the ROM 5, the HDD 7, or the like, by using the RAM 6 as a work area. Accordingly, the CPU 4 implements the function of a multifunction peripheral, the function of a copier, the function of a scanner, the function of a facsimile machine, or the function of a printer described above.

Figure 2:
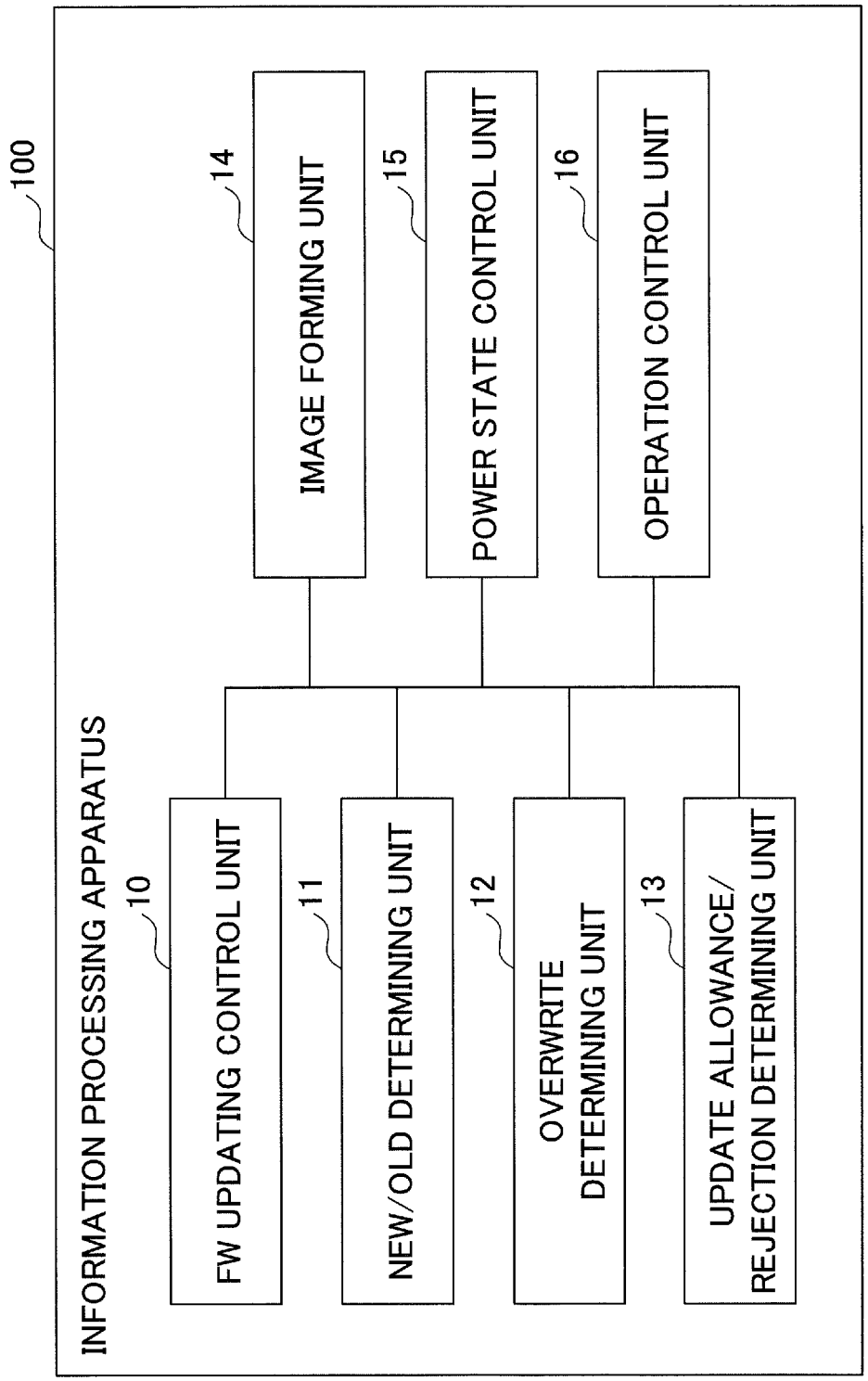
FIG. 2 is a diagram illustrating an example of a software configuration of an information processing apparatus according to an embodiment of the present invention.

FIG. 2 is a diagram illustrating an example of a software configuration of the information processing apparatus according to an embodiment of the present invention. The information processing apparatus 100 includes a FW updating control unit 10, a new/old determining unit 11, an overwrite determining unit 12, an update allowance/rejection determining unit 13, an image forming unit 14, a power state control unit 15, and an operation control unit 16. In the information processing apparatus 100 according to the present embodiment, the functions of the FW updating control unit 10, the new/old determining unit 11, the overwrite determining unit 12, and the update allowance/rejection determining unit 13 have particular features. The information processing apparatus 100 performs new/old determination at the time of making updates as follows, by using an old part number list (included program list). For example, the updating of programs include updating a customized program, updating a program to which a customized program is applied in a standard manner, updating a program at the time of the number change associated with a new order, and updating a program at the time of the change of a part number after a suffix cycle, etc. Hereinafter, the configurations and operations of the FW updating control unit 10, the new/old determining unit 11, the overwrite determining unit 12, and the update allowance/rejection determining unit 13 will be mainly described.

The FW updating control unit 10 performs the following determinations based on the determination results of the new/old determining unit 11, the overwrite determining unit 12, and the update allowance/rejection determining unit 13. The first determination is determining whether the FW is the FW that is an update target, and whether the updating of the FW is allowed or rejected (update allowance/rejection). The second determination is determining whether the updating is to be skipped (update skip) as a result of new/old determination. Specifically, the second determination is determining whether the updating should be skipped as a result of the new/old determination, even when it is determined that the FW is allowed to be updated by the FW updating control unit 10. The result of the new/old determination is the result of determination with respect to the FW by the new/old determining unit 11. The third determination is determining whether to overwrite a customized FW. A customized FW is a specially customized package. A specially customized package corresponds to each of a "special order CS" and an "individual LRC" as described below. A specific example of operations of the FW updating control unit 10 will be described later.

The new/old determining unit 11 receives FW and determines whether the received FW is new FW compared to the existing FW (new/old determination). An existing FW is a program that is stored in the ROM 5, the HDD 7, etc. In this new/old determination, a known program list is used. A known program list will be described in detail with reference to FIG. 4 below. An example of specific operations of the new/old determining unit 11 will also be described below.

The overwrite determining unit 12 determines whether to overwrite the received FW over the existing FW. For example, when the program that is the update target is a customized program, and this program is included in the known program list, this program is overwritten by a bulk delivery program. A bulk delivery program is an update program (a program used for updating) that is bulk-delivered to the information processing apparatus 100 via the network 200, for example. Hereinafter, a bulk delivery program may be referred to as "standard FW". An example of specific operations of the overwrite determining unit 12 will be described later.

The update allowance/rejection determining unit 13 performs the following operations. Specifically, when updating the customized program, the update allowance/rejection determining unit 13 confirms whether the customized program has the same customization or is the same program as a known program. When the customization or the program is the same, the update allowance/rejection determining unit 13 determines whether the updating of the customized program is allowed or rejected based on the value of the version. A customized program means a program that has been customized. The update allowance/rejection means whether to allow or reject the updating of the customized program. As the result of confirming whether the customized program has the same customization or is the same program as a known program, when it is confirmed the customization or the program is not the same, the update allowance/rejection determining unit 13 enables the updating of only a program of a same module ID existing in the known program list. The same module ID will be described below in detail in the description of FIG. 4.

The image forming unit 14 is a means for executing the function of a multifunction peripheral, the function of a copier, the function of a scanner, the function of a facsimile machine, or the function of a printer described above. The image forming unit 14 is implemented by a program executed by the engine unit 1 and the CPU 4 illustrated in FIG. 1, for example.

The power state control unit 15 controls the startup of the information processing apparatus 100, the shutdown of the information processing apparatus 100, the transition to the power saving mode (hot standby state) of the information processing apparatus 100 after the startup, the return of the information processing apparatus 100 to a regular mode from the power saving mode, and the like. For example, when the information processing apparatus 100 is in the power saving mode, the power state control unit 15 causes the information processing apparatus 100 to return to a regular mode from the power saving mode by being triggered by a panel touch operation, a timer, or external access via the network.

The operation control unit 16 includes an input unit that accepts an operation of a user and a display unit that displays a message to be reported to the user. The operation control unit 16 includes the operation unit 2 illustrated in FIG. 1. The operation control unit 16 accepts an operation performed by the user and displays various kinds of information. The operation control unit 16 is also a function unit that controls the overall operations performed by the user. For example, the operation control unit 16 functions as a physical switch that switches the main power supply to an ON state or an OFF state, and also functions as a detecting unit that detects operations performed on the touch panel.

Figure 3:
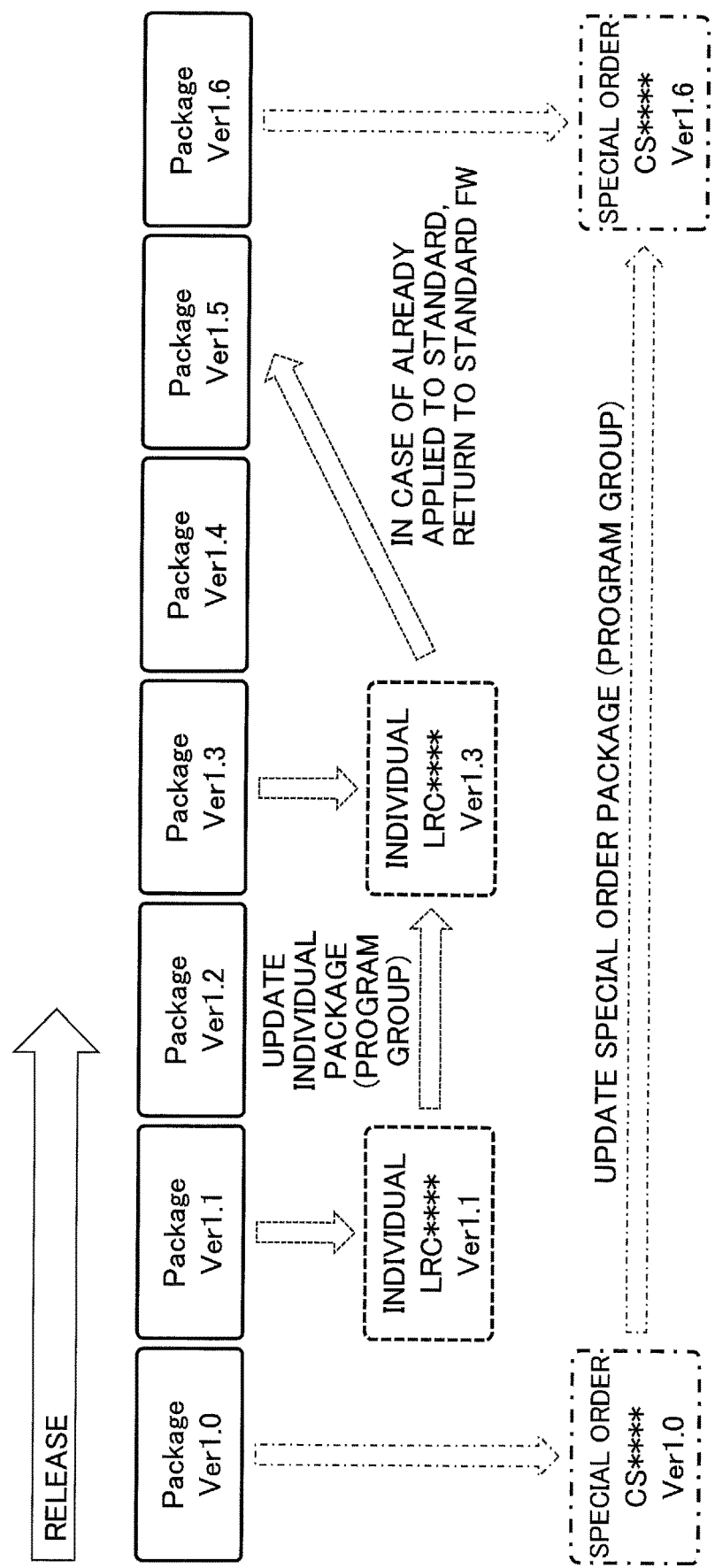
FIG. 3 is a diagram illustrating an example of a release system of package data according to an embodiment of the present invention.

FIG. 3 is a diagram for explaining an example of a release system of package data. The "package" illustrated in FIG. 3 represents a group of programs including a plurality of pieces of FW. A specific example of the package is described with reference to FIG. 4. Returning to FIG. 3, "Ver. 1.0" to "Ver. 1.6" illustrated in FIG. 3 are information indicating the version of each package. "Special order CS" is a package customized by a special order. "Individual LRC" is, a package that is individually customized. "Special order CS" is a group of special order pieces of FW or a group of special order programs, and, therefore, "special order CS" may be referred to as "special order FW" or "special order program". Also, each of "special order CS" and "individual LRC" is a specially customized package and may therefore be referred to collectively as "customized FW". Customized FW has a known program list. A specific example of a known program list is described below.

Thus, by having a known program list, the information processing apparatus 100 can recognize that the FW is a customized FW that can be upgraded to a higher version, and can update only a customized FW that is recognized as being a customized FW that can be upgraded to a higher version. The determination that the customized FW can be upgraded to a higher version, is to allow the updating to FW of a new version.

Note that depending on the restoration of the FW, there is a case of allowing the update to FW of an old version instead of to FW of a new version. In the related art, it has not been possible to determine that the FW is "FW of a new version", for FW including a different part number. In the information processing apparatus 100 according to the present embodiment, for such FW, it is possible to accurately make a new/old determination of the FW (update allowance version determination), by referring to a known program list. A "different part number" means a part number after being changed due to the difference in the model, a part number after being changed due to individual customization, a part number after being changed due to customization by special ordering, and a part number after being changed due to operational reasons, etc. By applying this method, i.e., by referring to the known program list, it is possible to return to the standard program, when an applied individual program (customized program) is registered in the known program list included in the standard FW (bulk delivery program).

FIG. 4 is a diagram illustrating an example of a plurality of pieces of FW included in a package, a known program list of each of the plurality of pieces of FW, and known part numbers. A package 300 illustrated in FIG. 4 includes a plurality of pieces of FW, such as copy FW, scanner FW, printer FW, and system FW. On the left side of FIG. 4, the part number and the version of each of the copy FW, the scanner FW, the printer FW, and the system FW are illustrated. On the right side of FIG. 4, a known program list and known part numbers included in each of the copy FW, the printer FW, and the system FW are illustrated. The known part number corresponds to the same module ID described above (identification information for identifying whether the program that is the update target is the same program as a known program). The known part number is an old part number (a part number that is known) included as the program. However, the known part number is not necessarily the same as the same module ID. The same module ID is information for identifying whether the program that is the update target is the same program (as a known program).

Each of the copy FW, the scanner FW, and the system FW includes a known program list. These known program lists include known part numbers. The known part number represents a part number that identifies each customized FW (special order/individual), and a part number different from the part number of the FW of the new version. The known part number is a part number (old part number) older than the part number (new part number) assigned to the FW of the new version. The new part numbers are "AAA", "BBB", "CCC", "DDD", etc., illustrated on the left side of FIG. 4.

For example, "known part number: CS13302" included in the known program list of the copy FW represents the part number of the customized FW manufactured by special order. "Known part number: LRC15402" in the known program list of the copy FW represents the part number of individually manufactured customized FW. "Known part number: CC-2" included in the known program list of the printer FW is a part number different from "part number: CCC" that identifies the printer FW of version 1.00 (FW of new version). "Known part number: DD-1" included in the known program list of the system FW is a part number different from "part number: DDD" that identifies the system FW of version 2.50 (FW of new version). Therefore, if the program is the same program that is of the same machine type or the same model as the known program, by referring to the known program list, it is possible to accurately determine whether the FW is old or new (update allowance version determination), so that the FW can be updated to FW of a different part number from that included in the known program list.

The scanner FW does not include a known program list. The update target of the scanner FW is only the scanner FW of a different version having a part number "BBB", among the scanner programs of the same machine type or the same model as a known program.

Figure 5:
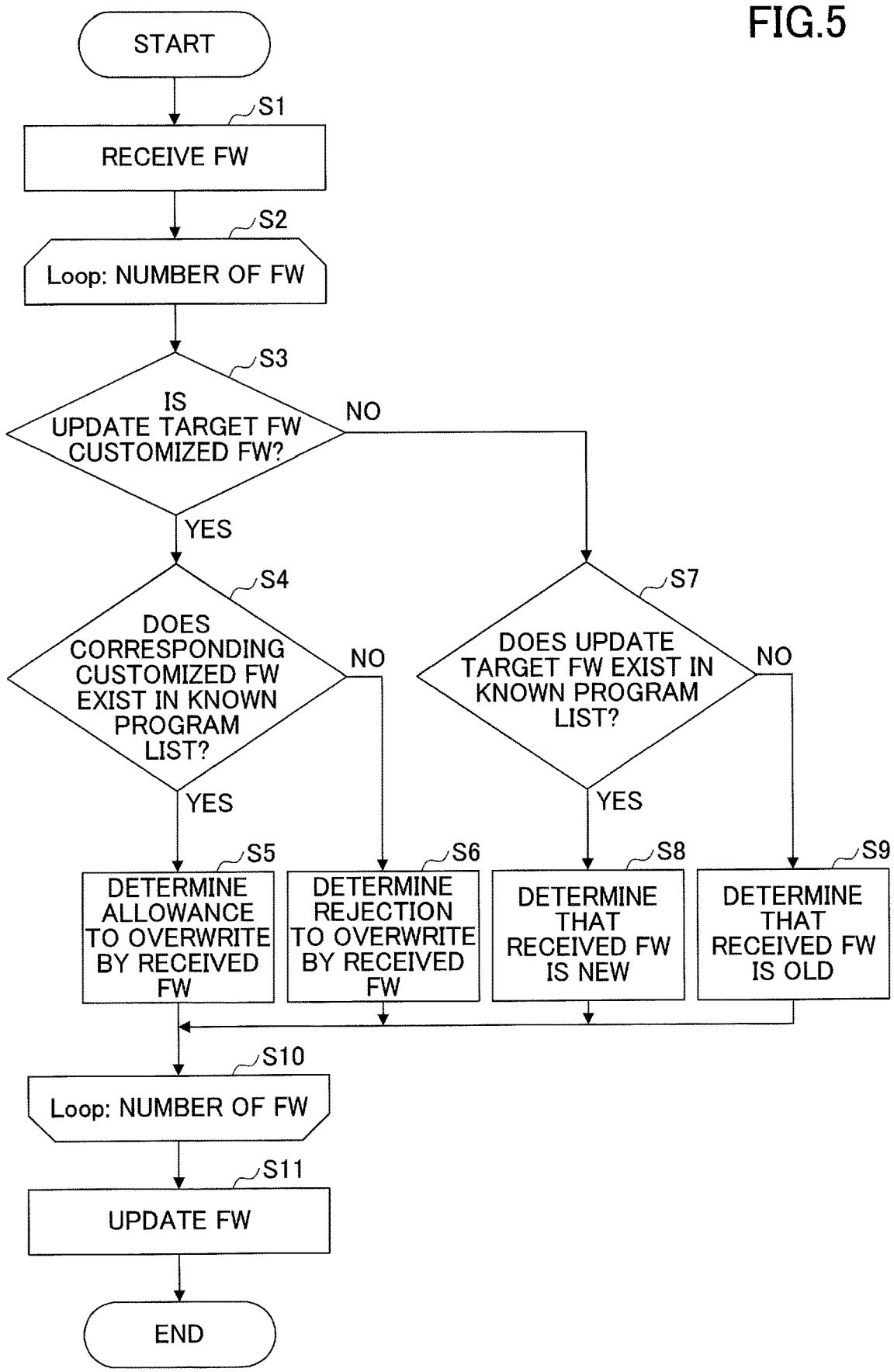
FIG. 5 is a first flowchart illustrating the operation mainly performed by an new/old determining unit and an overwrite determining unit according to an embodiment of the present invention.

Next, an operation of the information processing apparatus 100 will be described. FIG. 5 is a first flowchart illustrating the operation mainly performed by the new/old determining unit 11 and the overwrite determining unit 12. When the information processing apparatus 100 receives FW (step S1), the information processing apparatus 100 repeats the processes in steps S2 to S10 until a preset number of pieces of FW is reached.

In step S3, the information processing apparatus 100 determines whether the received FW (update target) is a customized FW. When the received FW (update target) is a customized FW (YES in step S3), the information processing apparatus 100 performs the process in step S4. When the received FW (update target) is not a customized FW (NO in step S3), the information processing apparatus 100 performs the process in step S7.

In step S4, the information processing apparatus 100 determines whether the customized FW is present in the known program list. When the customized FW is present in a known program list (YES in step S4), the information processing apparatus 100 determines to allow the overwriting by the received FW, with respect to the customized FW in the known program list (step S5).

When the customized FW does not exist in the known program list (NO in step S4), the information processing apparatus 100 determines to reject the overwriting by the received FW, with respect to the customized FW in the known program list (step S6).

In step S7, the information processing apparatus 100 determines whether the FW that is the update target exists in the known program list. When the FW that is the update target exists in a known program list (YES in step S7), the information processing apparatus 100 determines that the received FW is newer than the existing FW (step S8).

Returning to step S7, when the FW that is the update target does not exist in the known program list (NO in step S7), the information processing apparatus 100 determines that the received FW is older than the existing FW (step S9).

The determination of whether to update the FW based on the result of the new/old determination of step S8 and step S9, differs depending on the FW update function (purpose) to be executed.

In step S11, the information processing apparatus 100 updates the FW in accordance with the determination result of each of step S5, step S6, step S8, and step S9.

Figure 6:
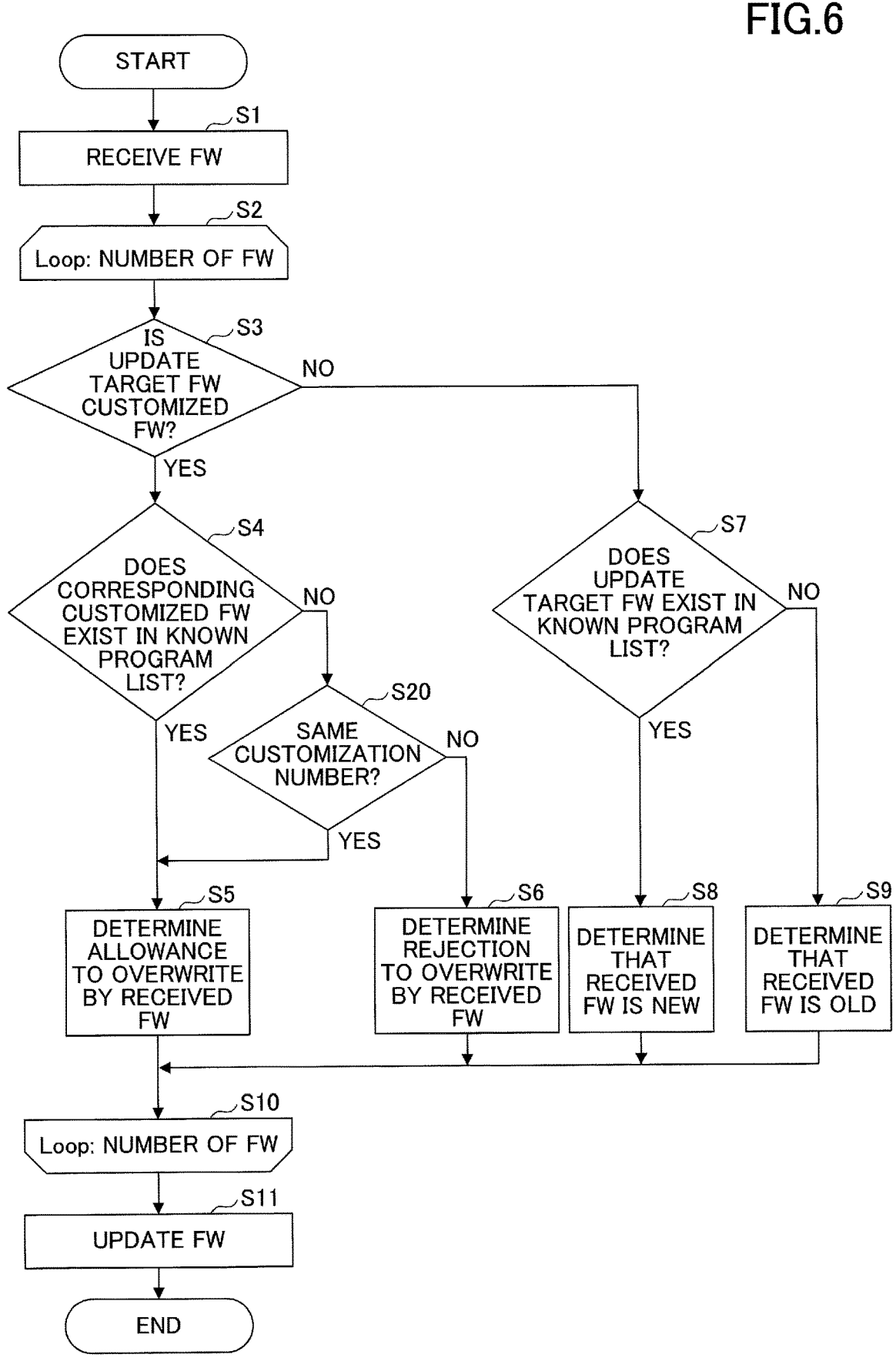
FIG. 6 is a second flowchart illustrating the operation mainly performed by an update allowance/rejection determining unit according to an embodiment of the present invention.

FIG. 6 is a second flowchart illustrating an operation mainly performed by the update allowance/rejection determining unit 13. The flowchart illustrated in FIG. 6 is a partially modified version of the flowchart illustrated in FIG. 5. In the flowchart illustrated in FIG. 6, the process of step S20 is added between step S4 and step S6. In the flowchart illustrated in FIG. 6, when the customized FW does not exist in the known program list, it is determined whether the customization number of the FW that is the update target is the same as the customization number of a known number. The processes other than step S20 are the same as those illustrated in FIG. 5, and, therefore, descriptions thereof are omitted below.

When the customized FW does not exist in the known program list (NO in step S4), the information processing apparatus 100 determines whether the customization number of the FW that is the update target is the same as a known number (step S20). The determination of whether the customization number of the FW that is the update target is the same as a known number is performed by determining whether a same module ID (known number) is the same as the customization number of the FW that is the update target. As a result, when the customization number of the FW that is the update target is the same as the known number (YES in step S20), the process (overwrite allowance determination) of step S5 is performed.

When the customization number of the FW that is the update target is not the same as the known number (NO in step S20), the process (overwrite rejection determination) of step S6 is performed.

As described above, when the program that is the update target is a customized program, the update allowance/rejection determining unit 13 of the information processing apparatus 100 determines whether the customization number of the program that is the update target is the same as a known number, by using identification information. When the customization number is the same as a known number, the update allowance/rejection determining unit 13 determines whether the program that is the update target can be updated based on the value of the version of the new program. When the customization number is not the same as a known number, the update allowance/rejection determining unit 13 only enables the updating of the program of the identification information existing in the known program list. With this configuration, it is possible to properly perform the update allowance/rejection determination, in consideration of whether a customized program includes customized contents. A customized program is a so-called special order program or an individual program, which is basically independent for each special order number or an individual number. A customized program is basically prohibited from being overwritten; however, depending on the contract or operation, there are cases in which the special order number is re-assigned or an additional special order is made, and there are cases in which new customization covering the old customization content is made. Only in such cases, it is necessary to perform the overwriting, and, therefore, it is determined as to whether overwriting is allowed. This determination is not a simple new/old determination, but it is determined whether a function is included by using a known program list.

Figure 7:
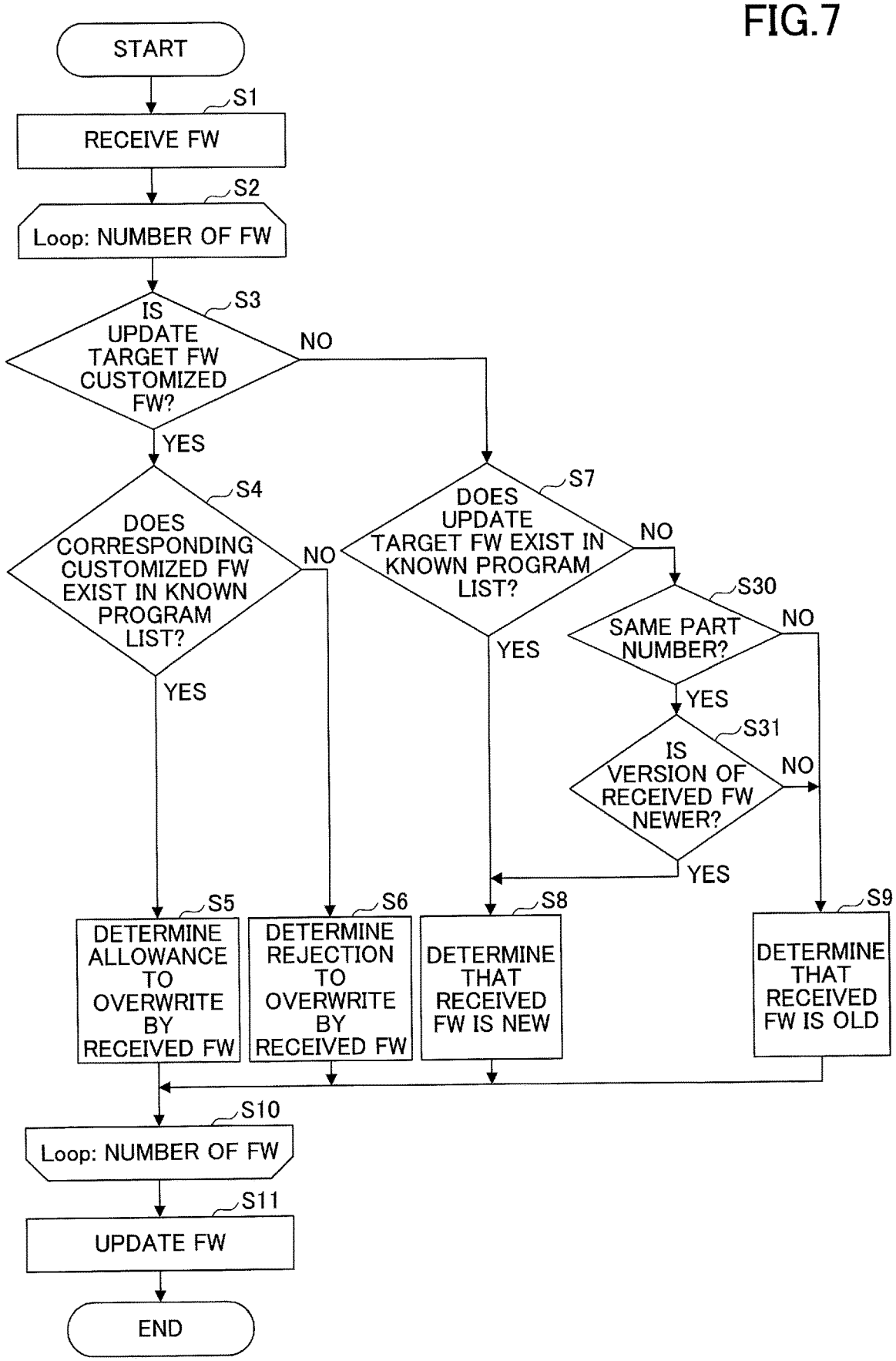
FIG. 7 is a third flowchart illustrating the operation mainly performed by the new/old determining unit according to an embodiment of the present invention.

FIG. 7 is a third flowchart illustrating an operation mainly performed by the new/old determining unit 11. The flowchart illustrated in FIG. 7 is a partially modified version of the flowchart illustrated in FIG. 5. In the flowchart illustrated in FIG. 7, the processes of steps S30 and S31 are added between step S7 and step S9. In the flowchart illustrated in FIG. 7, when the FW that is the update target is a non-customized program (FW that is not customized) and the FW that is the update target does not exist in the known program list, it is determined whether the part number of the received FW is the same as the part number of the existing FW. Further, new/old determination is made on the received FW by comparing the version of the received FW version with the version of the existing FW. The processes other than steps S30 and S31 are the same as those illustrated in FIG. 5, and, therefore, descriptions thereof are omitted below.

In step S7, when the FW that is the update target does not exist in the known program list (NO in step S7), the information processing apparatus 100 determines whether the part number of the received FW is the same as the part number of the existing FW (step S30).

When the part number of the received FW is the same as the part number of the existing FW (YES in step S30), the process in step S31 is performed. When the part number of the received FW is not the same as the part number of the existing FW (NO in step S30), the process in step S9 is performed.

In step S31, the information processing apparatus 100 compares the version of the received FW with the version of the existing FW. As a result of the comparison, when the version of the received FW is newer than the version of the existing FW (YES in steps S31), the process of step S8 is performed. When the version of the received FW is not newer than the version of the existing FW (NO in step S31), the process in step S9 is performed.

As described above, the new/old determining unit 11 of the information processing apparatus 100 determines whether the part number of the bulk delivery program is the same as the part number of the program that is the update target, and when the part numbers are the same, the new/old determining unit 11 makes the new/old determination with respect to the program that is the update target by comparing the version of the bulk delivery program with the version of the program that is the update target. By this configuration, if the part numbers are the same, the programs are basically represented by the same version system, and, therefore, the new/old determination can be made only by using the version, so that a known program list does not need to be used.

Figure 8:
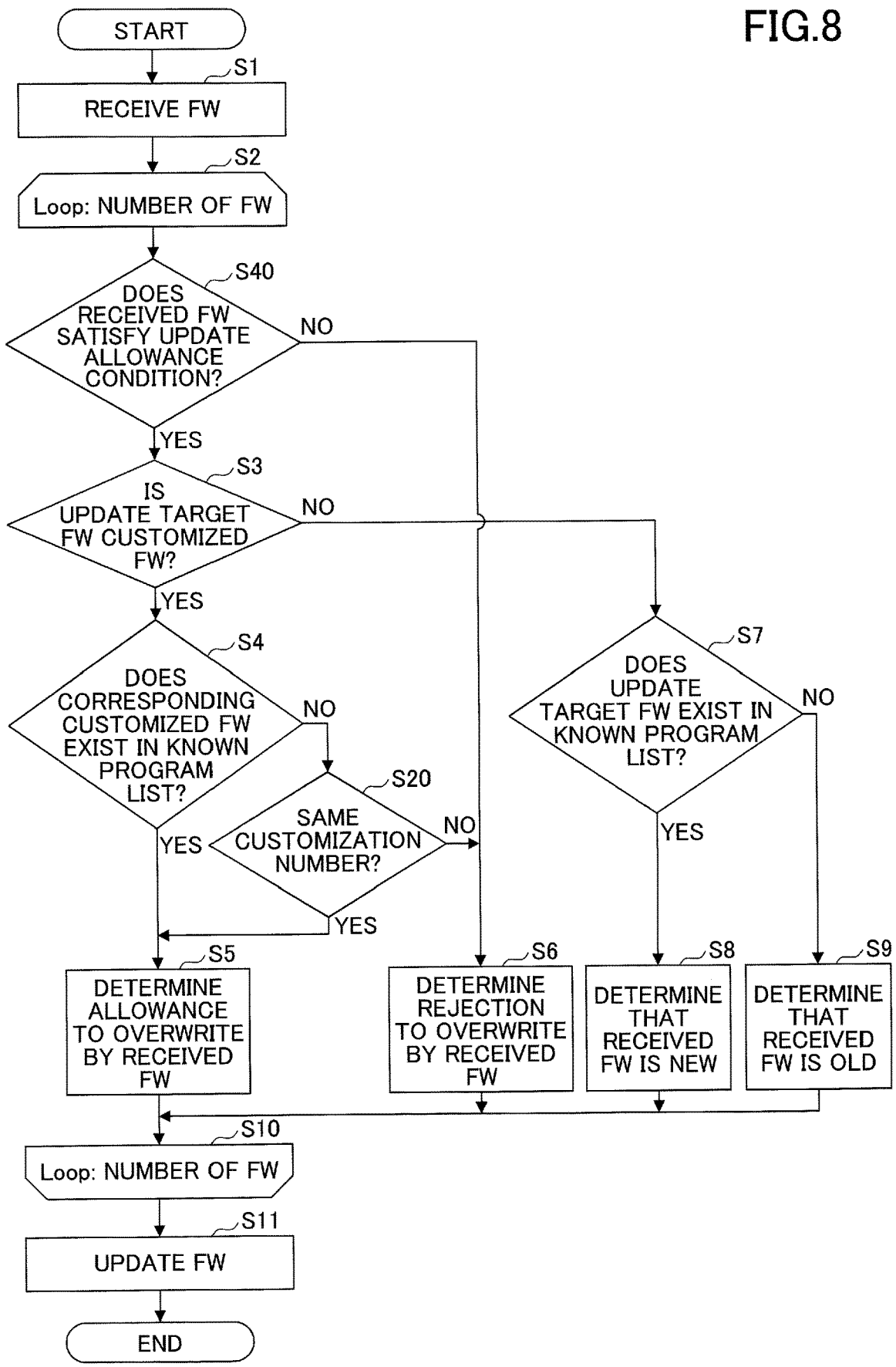
FIG. 8 is a fourth flowchart illustrating the operation mainly performed by the update allowance/rejection determining unit according to an embodiment of the present invention.

FIG. 8 is a fourth flowchart illustrating an operation mainly performed by the update allowance/rejection determining unit 13. The flowchart illustrated in FIG. 8 is a partially modified version of the flowchart illustrated in FIG.

6. In the flowchart illustrated in FIG. 8, the process of step S40 is added between steps S2 and S3. In the flowchart illustrated in FIG. 8, it is determined whether the received FW satisfies the update allowance condition. The update allowance condition is the condition with respect to writing a program of a different machine type, a program of a device of a different destination, a program that is not installed, a malicious program (illegal signature) or the like, into the information processing apparatus 100. Failure to satisfy the update allowance condition indicates that the condition with respect to writing any of these programs into the information processing apparatus 100 is not satisfied.

When the received FW does not satisfy the update allowance condition (NO in step S40), the information processing apparatus 100 performs the process in step S6. That is, the new/old determination is not performed on the received FW, but instead, an overwrite rejection determination is made. As a result, the customized FW of the known program list is excluded from the update target. When the received FW satisfies the update allowance condition (YES in step S40), the information processing apparatus 100 performs the process in step S3.

Figure 9:
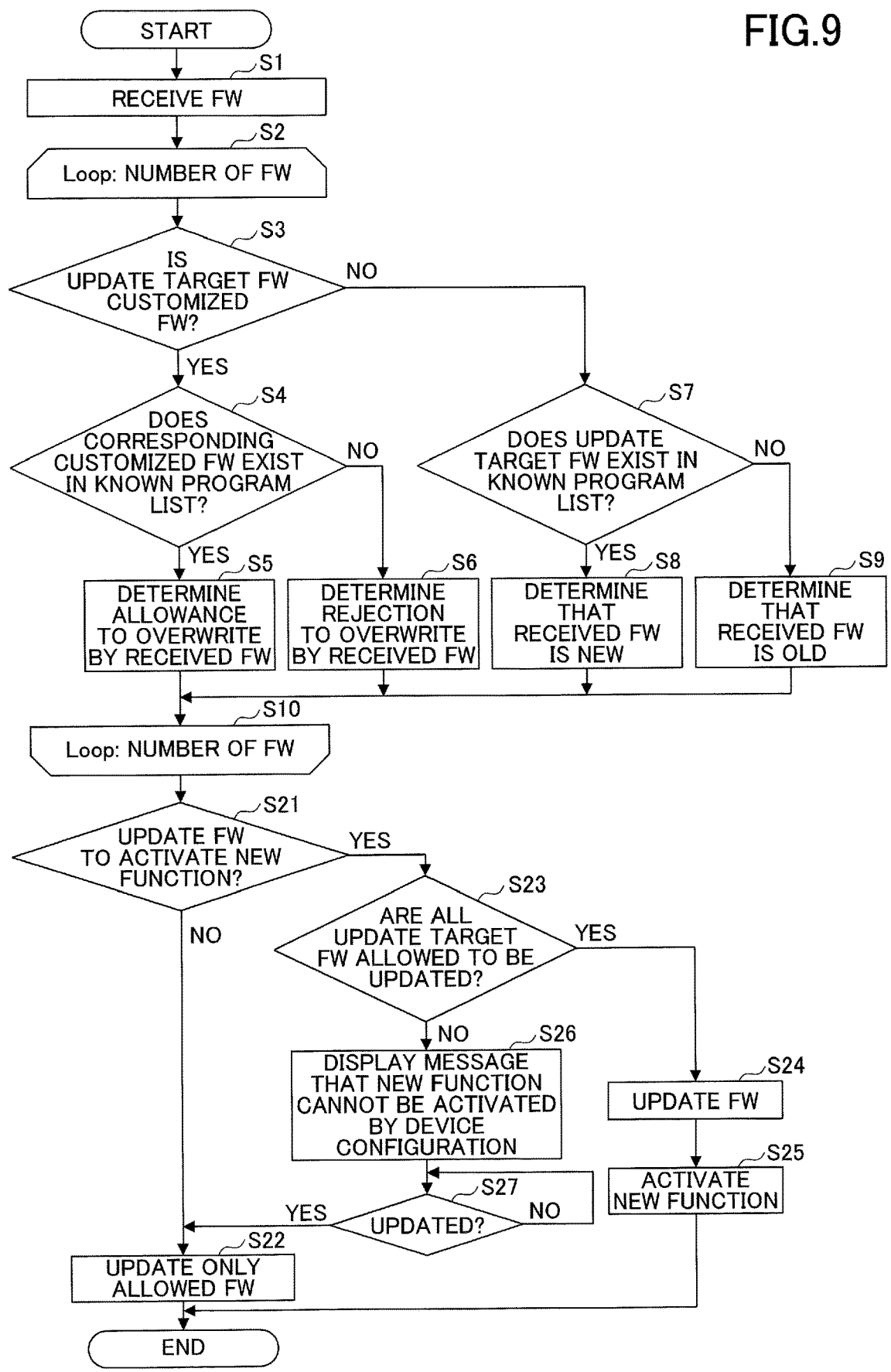
FIG. 9 is a flowchart of update processing when an update allowance/rejection program is included according to an embodiment of the present invention.

FIG. 9 is a flowchart of an update process when an update allowance/rejection program is present. The flowchart illustrated in FIG. 9 is a partially modified version of the flowchart illustrated in FIG. 5. The flowchart illustrated in FIG. 9 differs in the processes after step S10.

The information processing apparatus 100 updates only a program that can be updated, in a case where the updating of the FW is not for activating a new function (updating a package including a plurality of programs). In the case of updating FW for activating a new function (updating a package including a plurality of programs), when all programs can be updated, the programs are updated, and the new function is activated (version of ACT is upgraded). The "version of ACT" means the function version; this is different from, for example, the ROM version (release version), and this is a version indicating how much the function (group) is valid. Depending on a special order program or an individual program (customized program), there may be a program for which the updating is not shared; in this case, the information processing apparatus 100 displays a message that the function cannot be updated by the device configuration, and when the user approves of this message and instructs the update, only the allowed program is updated. The activation is not performed (version of ACT remains unchanged). If the user disapproves, the program will not be updated.

Specifically, in step S21, the update allowance/rejection determining unit 13 of the information processing apparatus 100 determines whether the updating of the FW is for activating a new function (updating a package including a plurality of programs), and when the updating of the FW is for activating a new function (YES in step S21), the process in step S23 is performed. That is, at a timing when the new function is to be enabled (the new function is activated), when at least one piece of FW is allowed to be updated among the pieces of FW that are update targets, the update allowance/rejection determining unit 13 determines whether updating is allowed for all of the pieces of FW that are update targets.

When updating is allowed for all of the pieces of FW that are update targets (YES in step S23), the information processing apparatus 100 updates all of the pieces of FW that are update targets (step S24), enables the new function (activates the new function) (step S25), and ends the processing.

When updating is not allowed for all of the pieces of FW that are update targets (NO in step S23), the information processing apparatus 100 displays a message that the new function cannot be enabled by the device configuration (new function cannot be activated) (step S26). This display is performed, for example, by displaying the message on a screen provided in the operation unit 2.

After step S26, when the user approves of the message that the new function cannot be enabled and instructs the update (YES in step S27), the process in step S22 is performed, that is, only the allowed FW is updated and the new function is not activated (the version of ACT does not change).

When the updating of the FW is not for activating a new function (NO in step S21), the update allowance/rejection determining unit 13 updates only the FW for which the updating is allowed (step S22), and the processing ends. That is, when at least one of the programs is not allowed to be updated among the plurality of programs that are update targets, none of the plurality of programs that are update targets are updated. From the pieces of FW that are update targets determined in step S21, the FW that does not satisfy the update condition of FIG. 8 is excluded.

The flowchart illustrated in FIG. 9 assumes a case in which there is a combination of pieces of FW in the received FW group (package), and unless all of the necessary pieces of FW are updated, the information processing apparatus 100 does not operate properly at the next startup. For example, when the in-device FW (existing FW) is customized, and, therefore, some pieces of the FW in the combination cannot be updated, some of the pieces of FW in the combination are written into the device (the information processing apparatus 100). However, a program that is prohibited from overwriting a customized program cannot be written into the device, and, therefore, when the information processing apparatus 100 starts up the next time, a failure occurs. In order to prevent such a failure, the information processing apparatus 100 performs the update process only when all of the pieces of FW that are update targets are allowed to be updated.

For example, when a package, which is a program group including customized programs, is released, and subsequently, the version is upgraded by correcting a failure in the standard program, the updated version of the standard program cannot be applied to a device including a customized program. In a case where a special order version package is redesigned by adding a countermeasure version of the standard FW to the same customized program, the effort required for redesigning and evaluating the package is increased (the required effort is increased according to the number of special orders and the number of times of upgrading the version). If a major function is added/changed, the API specification is changed so that the compatibility among programs cannot be maintained, and therefore, the updated version of the standard program is prevented from being applied to a device including a customized program. By ensuring that a combination for a major function addition/change occurs only at a timing when enabling a new function, for a simple update, a combination will not occur because a simple update is not a functional addition, and rewriting of a program can be allowed.

Also, in case the update is skipped as the result of the new/old determination, there is no problem with respect to the combination, and, therefore, the updating is allowed without determining whether updating is allowed. The reason why "FW that does not satisfy the update condition in FIG. 8 is excluded" is that, with respect to FW for an optional device, etc., for which whether updating is allowed will change depending on whether the FW is installed in the device, there will be no combination with FW that is not installed in the device. That is, such FW does not exist in the configuration, and, therefore, there will be no combination with such FW.

As described above, the information processing apparatus 100 according to an embodiment of the present invention includes a new/old determining unit that makes a new/old determination with respect to a program that is an update target, by using a known program list including identification information that identifies whether the program that is the update target is the same program as a known program. Further, the information processing apparatus 100 includes an overwrite determining unit that overwrites a program that is the update target by a bulk delivery program that updates the program that is the update target, when the program that is the update target is a customized program and is a program included in a known program list. By this configuration, a program of the same part number is basically represented by the same version system, and, therefore, the new/old determination can be made only by the version. Therefore, the new/old determination at the time of updating can be made by using an old part number list (included program list), without using a known program list.

Further, when the part number of the bulk delivery program is changed, the new/old determining unit makes the new/old determination for the program that is the update target by using the known program list. With this configuration, not only for a customized program, but also when the part number is changed due to operational reasons, the new/old determination can be properly made.

Further, in the case of different machine types, the update allowance/rejection determining unit determines whether the identification information matches, to determine whether the program that is an update target can be updated. By this configuration, an incorrect operation of installing FW for a different machine type into the device, can be prevented.

In the information processing method according to the present embodiment, a computer capable of updating at least one program by updating firmware, makes a new/old determination for a program that is an update target by using a known program list including identification information. Further, in the information processing method according to the present embodiment, when the program that is the update target is a customized program and is a program included in a known program list, the program that is the update target is overwritten by a bulk delivery program that updates the program that is the update target. This enables the computer to appropriately determine whether to overwrite a customized program.

A program according to the present embodiment allows a computer capable of updating at least one program by updating firmware, to make a new/old determination for a program that is an update target by using a known program list including identification information. Further, in the program according to the present embodiment, when the program that is an update target is a customized program and is a program included in a known program list, the program that is the update target is overwritten by a bulk delivery program that updates the program that is the update target. This enables the computer to appropriately determine whether to overwrite the customized program.

Figure 10:
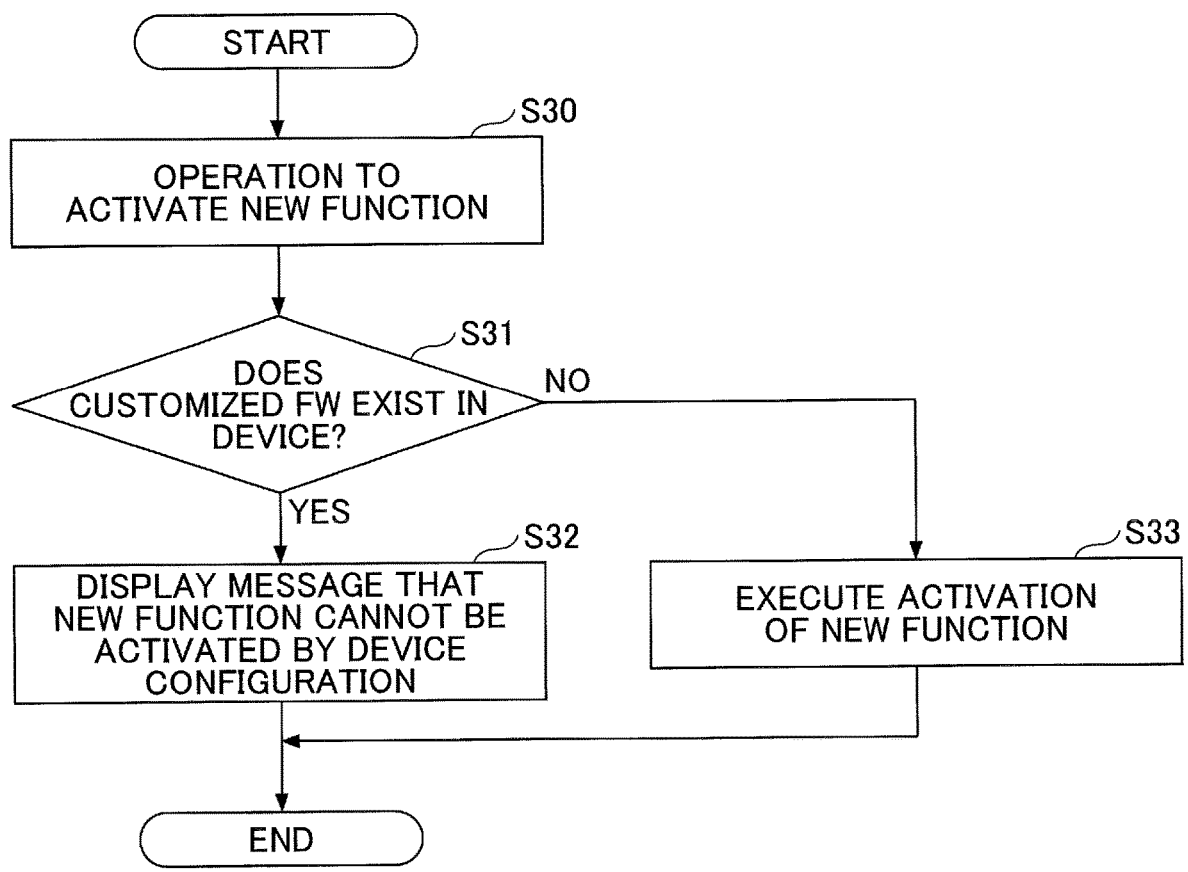
FIG. 10 is a flowchart for executing a new function from a utility according to an embodiment of the present invention.

FIG. 10 is a flowchart of a case of activating a new function from a utility. In step S30, for example, when an instruction (operation) to activate a new function is given from a utility such as an application market, and when a customized program exists in the device (YES in step S31), a message that the information processing apparatus 100 cannot activate the new function by the device configuration is displayed (step S32). "When an instruction (operation) to activate a new function is given from a utility such as an application market" means downloading the new function from an application market and installing the new function. This operation is performed at the operation unit 2 of the information processing apparatus 100. For example, when the regular part number is "D123456" and the customization part number is "CS12345," it is possible to determine whether a customized program exists in the device by comparing the character strings of these part numbers. When a customized program does not exist in the device (NO in step S31), the procedure illustrated in FIG. 9 is to be performed in order to activate the new function (step S33).

Figure 11:
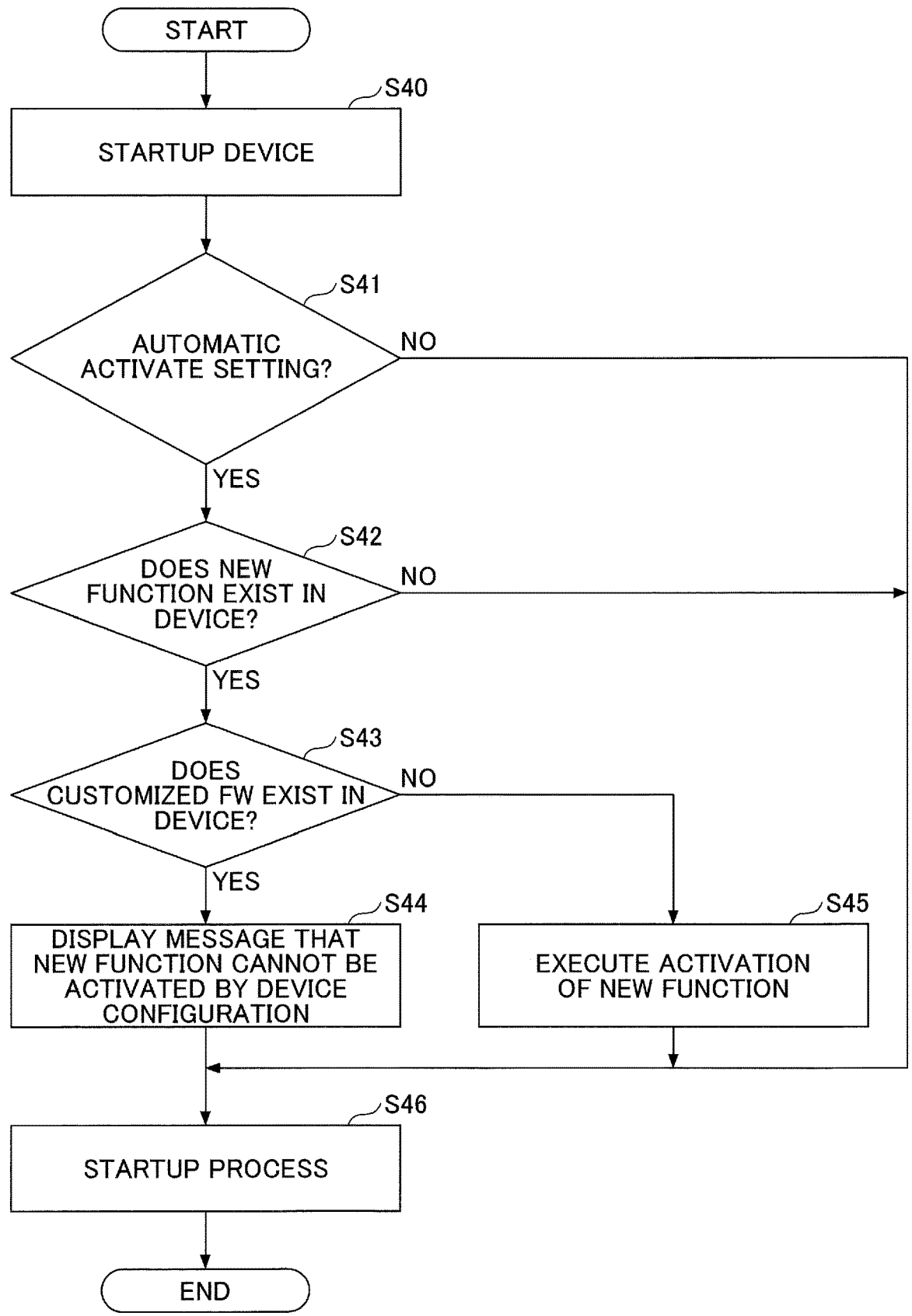
FIG. 11 is a flowchart for automatically activating a new function when a customized program is installed according to an embodiment of the present invention.

FIG. 11 is a flowchart of a case of executing automated activation of a new function when a customized program is installed. In step S40, when the information processing apparatus 100 is started up and an automatic function enabling setting (automatic activation setting) is made (YES in step S41), it is determined whether a new function exists in the device (step S42).

When a new function exists in the device (YES in step S42), and when a customized program exists in the device (YES in step S43), the information processing apparatus 100 displays a message that the ROM 5 can be updated but the new function cannot be activated by the device configuration (step S44).

When a new function exists in the device (YES in step S42), and when a customized program does not exist in the device (NO in step S43), the processing procedure illustrated in FIG. 9 is to be performed to activate the new function.

When the automatic function enabling setting (automatic activation setting) is not made (NO in step S41), or when there is no new function in the device (NO in step S42), or when the process in step S44 is completed, or when the process in step S45 is completed, the startup process is performed in step S46.

According to one embodiment of the present invention, it is possible to determine whether to overwrite a customized program.

The information processing apparatus, the information processing method, and the recording medium are not limited to the specific embodiments described in the detailed description, and variations and modifications may be made without departing from the spirit and scope of the present invention.

What is claimed is:

1. An information processing apparatus configured to update at least one program by updating firmware, the information processing apparatus comprising:
 a processor that is configured to:
  determine whether a program that is an update target is new or old by using a known program list, the known program list including identification information for identifying whether the program that is the update target is a same program as a known program; and
  overwrite the program that is the update target with a bulk delivery program configured to update the program that is the update target, upon detecting that the program that is the update target is a customized program and is included in the known program list, wherein the known program lists include known part numbers, each known part number identifying each customized program that is specially manufactured by an individual order and being different from a part number of a new program.

2. The information processing apparatus according to claim 1, wherein the processor is further configured to:
determine whether a customization number of the program that is the update target is a same number as a customization number of the known program by using the identification information, upon detecting that the program that is the update target is the customized program,
determine whether the program that is the update target is allowed to be updated based on a value of a version of a new program, upon determining that the customization number of the program that is the update target is the same number as the customization number of the known program, and
enable updating of only a program corresponding to the identification information included in the known program list, upon determining that the customization number of the program that is the update target is not the same number as the customization number of the known program.

3. The information processing apparatus according to claim 1, wherein
the new/old determiner determines whether a part number of the bulk delivery program is a same number as a part number of the program that is the update target, and upon determining that the part number of the bulk delivery program is the same number as the part number of the program that is the update target, the new/old determiner determines whether the program that is the update target is new or old by comparing a version of the bulk delivery program with a version of the program that is the update target.

4. The information processing apparatus according to claim 1, wherein the overwrite determiner determines whether the program that is the update target is new or old by using the known program list, upon detecting that a part number of the bulk delivery program is changed.

5. The information processing apparatus according to claim 2, wherein the update allowance/rejection determiner determines whether the program that is the update target is allowed to be updated by determining whether the identification information of the program that is the update target and the identification information of the known program match each other, upon detecting that a machine type of the program that is the update target and a machine type of the known program are different.

6. The information processing apparatus according to claim 2, wherein the update allowance/rejection determiner prevents all of a plurality of the programs that are the update targets from being updated, upon detecting that at least one of the plurality of the programs that are the update targets is not allowed to be updated, at a timing of enabling a new function.

7. The information processing apparatus according to claim 2, wherein the update allowance/rejection determiner allows updating of a read-only memory (ROM) regardless of whether a customized program is included in the information processing apparatus, upon determining that a function of the program that is the update target is a same function as a function of the known program.

8. The information processing apparatus according to claim 2, wherein the update allowance/rejection determiner overwrites the customized program by using the known program list.

9. The information processing apparatus according to claim 1, wherein when an automatic function enabling setting is made, updating of a ROM is possible but a new function is not activated, and a message indicating that the updating of the ROM is possible but the new function is not activated is reported to a user.

10. The information processing apparatus according to claim 1, wherein when activating a function from a utility, the function is not activated and a message indicating that the function is not activated is reported to a user.

11. An information processing method executed by a computer, the computer being configured to update at least one program by updating firmware, the information processing method comprising:
determining whether a program that is an update target is new or old by using a known program list, the known program list including identification information for identifying whether the program that is the update target is a same program as a known program; and
overwriting the program that is the update target with a bulk delivery program configured to update the program that is the update target, upon detecting that the program that is the update target is a customized program and is included in the known program list,
wherein the known program lists include known part numbers, each known part number identifying each customized program that is specially manufactured by an individual order and being different from a part number of a new program.

12. A non-transitory computer-readable recording medium storing a program that causes a computer to execute a process, the computer being configured to update at least one program by updating firmware, the process comprising:
determining whether a program that is an update target is new or old by using a known program list, the known program list including identification information for identifying whether the program that is the update target is a same program as a known program; and
overwriting the program that is the update target with a bulk delivery program configured to update the program that is the update target, upon detecting that the program that is the update target is a customized program and is included in the known program list,
wherein the known program lists include known part numbers, each known part number identifying each customized program that is specially manufactured by an individual order and being different from a part number of a new program.

* * * * *